(12) United States Patent
Kiwan et al.

(10) Patent No.: US 11,648,957 B1
(45) Date of Patent: May 16, 2023

(54) METHODS AND SYSTEMS FOR CONTROLLING VEHICLE DRIVE AWAY

(71) Applicant: Ford Global Technologies, LLC, Dearborn, MI (US)

(72) Inventors: Rani Kiwan, Canton, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/650,986

(22) Filed: Feb. 14, 2022

(51) Int. Cl.
| | |
|---|---|
| *B60W 50/12* | (2012.01) |
| *B60W 50/14* | (2020.01) |
| *B60W 10/06* | (2006.01) |
| *B60W 10/10* | (2012.01) |
| *B60W 10/18* | (2012.01) |
| *B60W 10/02* | (2006.01) |
| *F02D 41/02* | (2006.01) |

(52) U.S. Cl.
CPC .......... *B60W 50/12* (2013.01); *B60W 10/026* (2013.01); *B60W 10/06* (2013.01); *B60W 10/10* (2013.01); *B60W 10/18* (2013.01); *B60W 50/14* (2013.01); *F02D 41/0235* (2013.01); *B60W 2510/068* (2013.01); *B60W 2710/024* (2013.01); *B60W 2710/0677* (2013.01); *B60W 2710/1005* (2013.01); *B60W 2710/182* (2013.01); *F02D 2200/0802* (2013.01)

(58) Field of Classification Search
CPC .... B60W 10/026; B60W 10/06; B60W 10/10; B60W 10/18; B60W 50/12; B60W 50/14; B60W 2510/068; B60W 2710/024; B60W 2710/0677; B60W 2710/1005; B60W 2710/182; F02D 41/0235; F02D 2200/0802
See application file for complete search history.

(56) References Cited

U.S. PATENT DOCUMENTS

| | | |
|---|---|---|
| 8,073,610 B2 | 12/2011 | Heap et al. |
| 8,818,659 B2 | 8/2014 | Sujan et al. |
| 10,486,687 B2 | 11/2019 | Johri et al. |
| 10,836,397 B1 | 11/2020 | Christensen et al. |
| 2017/0130635 A1* | 5/2017 | Smith ...................... B60K 6/24 |
| 2019/0120165 A1* | 4/2019 | Refalo ................ F02D 41/3854 |
| 2020/0191077 A1* | 6/2020 | Szczepanski ........... F02D 13/02 |

OTHER PUBLICATIONS

Kiwan, R. et al., "System and Method for Vehicle Drive-Away Control," U.S. Appl. No. 17/648,844, filed Jan. 25, 2022, 52 pages.

* cited by examiner

*Primary Examiner* — Edwin A Young
(74) *Attorney, Agent, or Firm* — Vincent Mastrogiacomo; McCoy Russell LLP

(57) ABSTRACT

Systems and methods for improving operation of a vehicle are presented. In one example, a controller may respond to a temperature of a catalyst to permit or temporarily inhibit a vehicle from moving. Engine load and engine emissions may be reduced by limiting vehicle motion until a catalyst temperature exceeds a threshold temperature.

20 Claims, 4 Drawing Sheets

METHODS AND SYSTEMS FOR CONTROLLING VEHICLE DRIVE AWAY

FIELD

The present description relates to a system and methods for improving emissions of an engine. The methods may be applied to control vehicle drive away.

BACKGROUND AND SUMMARY

An engine of a vehicle may be started after the engine has time to cool to near ambient temperature. The engine may produce higher emissions levels when the engine is cold started due to clearances within the engine and fuel preparation issues. A catalyst in the engine's exhaust system may have capacity to reduce such emission when the catalyst is at operating temperature, but a significant portion of engine emissions may pass through the catalyst when the catalyst temperature is not above a threshold temperature (e.g., a catalyst light-off temperature). Further, engine emissions may increase as engine load increases. For these reasons, it may be desirable to provide a way of limiting engine emissions at least until a catalyst reaches a threshold temperature.

The inventors herein have recognized that it may be desirable to reduce engine emissions during and after an engine cold start and they have developed a method for operating a vehicle, comprising: inhibiting the vehicle from moving in a forward or reverse direction via a controller in response to a catalyst temperature being less than a threshold temperature.

By inhibiting motion of a vehicle after a cold start, it may be possible to provide the technical result of reducing engine emissions via limiting engine load. In addition, temporarily inhibiting vehicle motion may help to ensure that the vehicle responds as expected and meets emissions requirements when vehicle motion is permitted.

The present description may provide several advantages. Specifically, the approach may reduce engine emissions. In addition, the approach may improve vehicle drivability when an engine is cold started. Further, the approach may be applied in different ways that allow the vehicle system to perform in accordance with vehicle operating conditions.

The above advantages and other advantages, and features of the present description will be readily apparent from the following Detailed Description when taken alone or in connection with the accompanying drawings. The term "driver" may be referred to throughout this specification and it refers to a human driver or human vehicle operator that is the authorized operator of the vehicle unless otherwise indicated.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
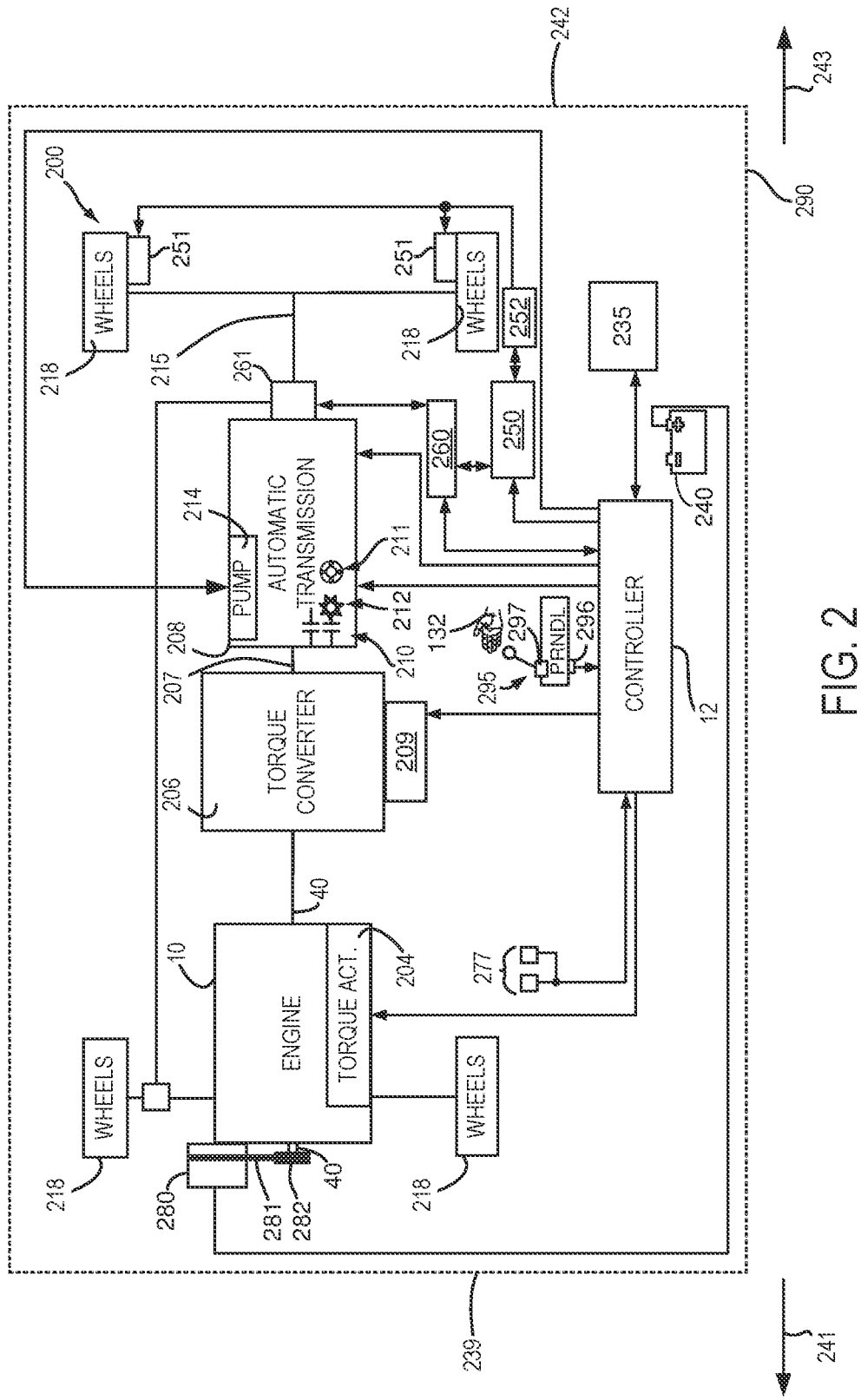
FIG. 2 shows an example vehicle driveline.
Figure 3:
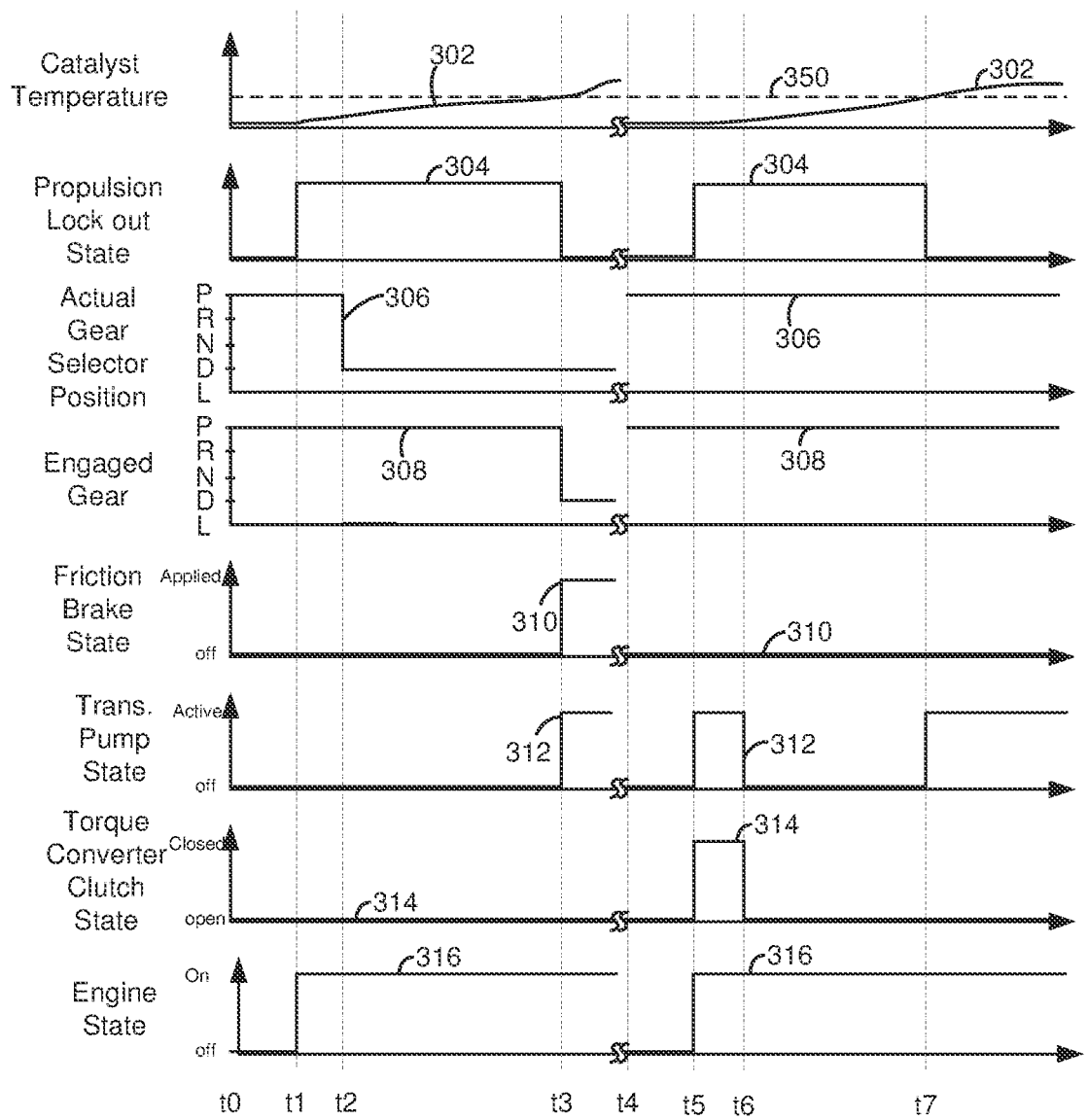
FIG. 3 shows an example prophetic vehicle operating sequence according to the method of FIG. 4.

The present description is related to controlling engine operation of a vehicle. The vehicle may include an engine and a transmission. The engine may be of the type shown in FIG. 1. The engine may be included in a driveline or powertrain that includes an automatic transmission as shown in FIG. 2. The vehicle may be operates according to the method of FIG. 4 as shown in the sequence of FIG. 3. The method of FIG. 4 may reduce engine emissions via limiting engine load after a cold engine start.

Figure 1:
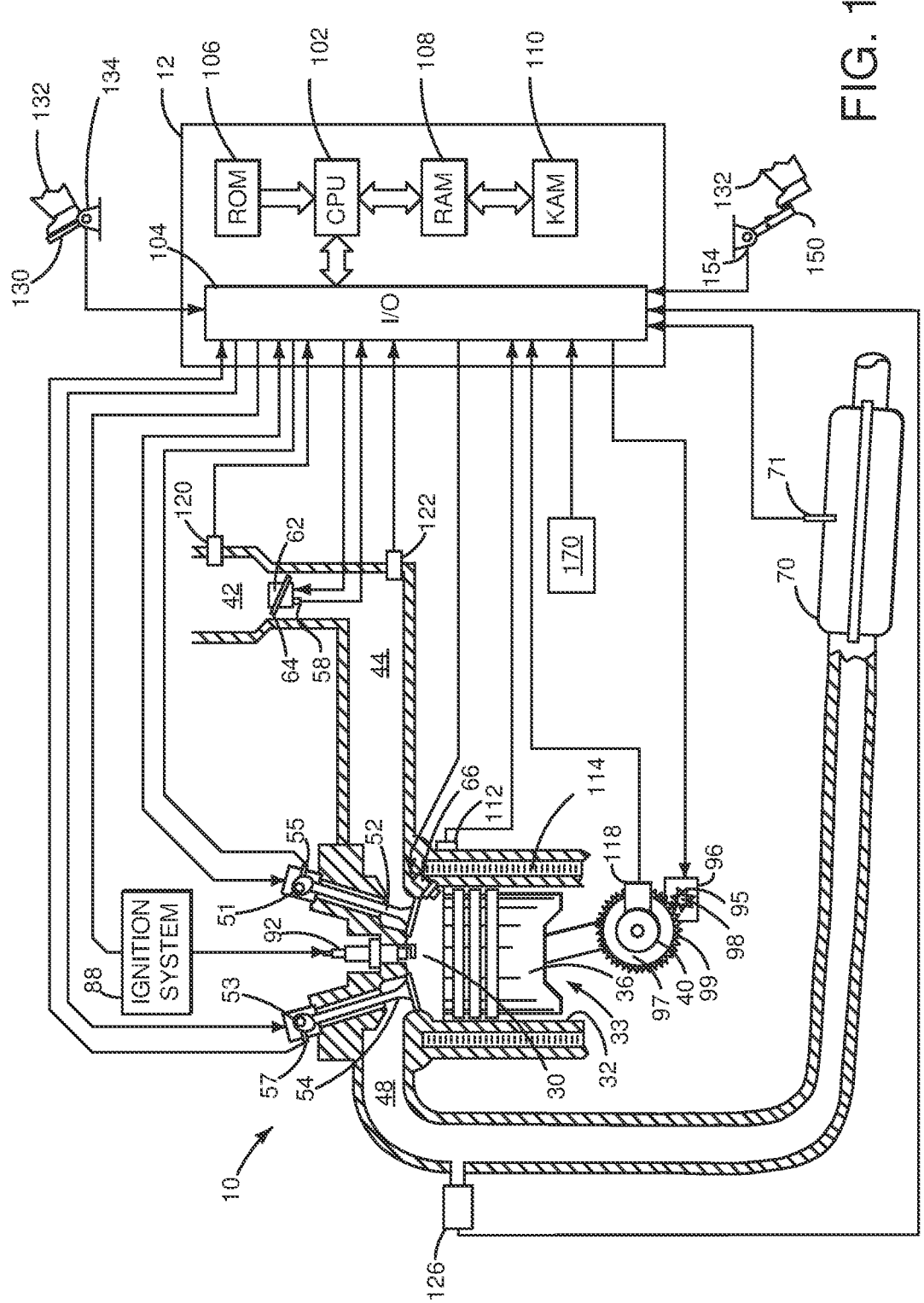
FIG. 1 is a schematic diagram of an engine.

Referring to FIG. 1, engine 10 is an internal combustion engine that comprises a plurality of cylinders, one cylinder 33 of which is shown in FIG. 1. Engine 10 is controlled by electronic engine controller 12. The controller receives signals from the various sensors of FIG. 1 and it employs the various actuators of FIG. 1 to adjust engine operation based on the received signals and instructions stored in memory of controller 12. For example, fuel injection timing, spark timing, and poppet valve operation may be adjusted responsive to engine position as determined from output of an engine position sensor 118.

Engine 10 includes combustion chamber 30, cylinder 33, and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 33, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a measurement of engine manifold absolute pressure (MAP) from pressure sensor 122 coupled to intake manifold 44; an engine position sensor from engine position sensor 118 sensing crankshaft 40 position; a measurement of air mass entering the engine from sensor 120; brake pedal position from brake pedal position sensor 154 when human driver 132 applies brake pedal 150; a measurement of catalyst temperature via catalyst temperature sensor 71; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may receive input from human/machine interface 170. In one example, human/machine interface 170 may be a touch screen display. In other examples, human/machine interface 170 may be a key board, pushbutton, or other known interface. Controller 12 may also display information and data to human/machine interface 170.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, is a block diagram of an example vehicle 290 including a powertrain or driveline 200. The powertrain of FIG. 2 includes engine 10 shown in FIG. 1. It may be appreciated that the methods and system described herein may be incorporated into other vehicle configurations without departing from the spirit and breadth of this disclosure.

Engine 10 may be started with an engine starting system shown in FIG. 1, via belt driven integrated starter/generator (BISG) 280, or via a driveline integrated starter/generator (ISG) (not shown) also known as a motor/generator. Further, torque of engine 10 may be adjusted via torque actuator 204, such as a fuel injector, throttle, camshaft, etc.

BISG 280 is mechanically coupled to engine 10 via belt 281 and pulley 282. BISG 280 may be coupled to crankshaft 40 or a camshaft (e.g., 51 or 53). BISG 280 may operate as a motor when supplied with electrical power via electric energy storage device 240, which may be referred to as a battery. BISG 280 may operate as a generator supplying electrical power to electric energy storage device 240.

It may be noted that this example shows a single controller. However, in other examples, the functions and operations performed via controller 12 may be distributed between a plurality of controllers.

Engine crankshaft may be coupled to torque converter 206, and torque converter 206 is mechanically coupled to automatic transmission 208 via transmission input shaft 207. Torque converter 206 may also include a torque converter clutch 209. Torque converter clutch 209 may be selectively locked and unlocked to allow torque to bypass torque converter 206 and be transmitted directly to transmission input shaft 207. Automatic transmission 208 includes gear clutches (e.g., gears 1-10) 210, and automatic transmission 208 may include one or more planetary gear sets 211. Automatic transmission 208 is a fixed step ratio transmission. The gear clutches 210 may be selectively engaged to change a ratio of an actual total number of turns of transmission input shaft 207 to an actual total number of turns of wheels 218. Gear clutches 210 may be engaged or disengaged via adjusting fluid supplied to the clutches via shift control solenoid valves (not shown). Torque output from the automatic transmission 208 may also be relayed to wheels 218 to propel the vehicle via output shaft 215. Specifically, automatic transmission 208 may transfer an input driving torque at the transmission input shaft 207 responsive to a vehicle traveling condition before transmitting an output driving torque to the wheels 216. Controller 12 may selectively activate a torque converter clutch 209, gear clutches 210, and gears 212. Controller 12 may also selectively deactivate or disengages a torque converter clutch 209, gear clutches 210, and gears 212.

Transmission gear selector 295 may receive input from human driver 132. Controller 12 may select which transmission gear clutches 210 to engage and disengage transmission gears based on a position of transmission gear selector 295. Transmission gear selector position sensor 296 provides position information to controller 12, and controller 12 may inhibit movement of transmission gear selector 295 from changing between positions P (park), R (reverse), N (neutral), D (drive), and L (low) via shift lock mechanism (e.g., a solenoid switch) 296.

In this example, vehicle 290 is shown configured as a four wheel drive vehicle. Torque may be transferred to wheels 218 at the front 239 of vehicle 290 or wheels 218 at rear 242 of vehicle 290 via transfer case 261. Vehicle 290 may be shifted into four wheel drive or two wheel drive via transfer case 261. A forward direction is indicated by arrow 241 and a reverse direction is indicated by arrow 243. Stability control system 260 may communicate with controller 12, brake controller 250, and transfer case 261 to vector torque between wheels 218 at front 270 of vehicle 290 and wheels 218 at rear 272 of vehicle 290. Brake controller 250 may selectively activate friction brakes 251 and optional brake pump 252.

In response to a request to increase a speed of vehicle 290, controller 12 may obtain a driver demand torque or power request from a driver demand pedal or other device. Controller 12 then allocates a fraction of the requested driver demand torque to the engine and the remaining fraction to the BISG 280. Controller commands engine 10 and BISG 280 to generate commanded torques. If the BISG torque plus the engine torque is less than a transmission input torque limit (e.g., a threshold value not to be exceeded), the torque is delivered to torque converter 206, which then relays at least a fraction of the requested torque to transmission input shaft 207. The torque converter clutch 209 may be locked and gears may be engaged via gear clutches 210 in response to shift schedules and torque converter clutch lockup schedules that may be based on transmission input shaft torque and vehicle speed. In some conditions when it may be desired to charge electric energy storage device 240, a charging torque (e.g., a negative ISG torque) may be requested while a non-zero driver demand torque is present. Controller 12 may request increased engine torque to overcome the charging torque to meet the driver demand torque.

In response to a request to reduce speed of vehicle 290 and provide regenerative braking, controller 12 may provide a negative desired wheel torque based on vehicle speed and brake pedal position. Controller 12 then allocates a fraction of the negative desired wheel torque to the BISG 280 and/or engine 10, and the remaining fraction to friction brakes 251. Further, controller 12 may shift gears 212 based on a unique shifting schedule to increase regeneration efficiency. BISG 280 may supply a negative torque to engine 10, but negative torque provided by BISG 280 may be limited. Further, negative torque of BISG 280 may be limited (e.g., constrained to less than a threshold negative threshold torque) based on operating conditions of electric energy storage device 240, by controller 12. Engine 10 may also provide a negative torque by ceasing fuel delivery to engine cylinders. Engine cylinders may be deactivated with intake and exhaust valves opening and closing during engine rotation or with intake and exhaust valves held closed over one or more engine cycles while the engine rotates. Any portion of desired negative wheel torque that may not be provided by engine 10 and/or BISG 280 because of transmission or BISG limits may be allocated to friction brakes 251 so that the desired wheel torque is provided by a combination of negative wheel torque from friction brakes 251, engine 10, and BISG 280.

Engine torque may be controlled by controller 12 adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 may control also torque output and electrical energy production from BISG 280 by adjusting current flowing to and from field and/or armature windings of BISG 280 as is known in the art.

Controller 12 may receive transmission input shaft position via a position sensor (not shown) and convert transmission input shaft position into input shaft speed via differentiating a signal from the position sensor. Controller 12 may receive transmission output shaft torque from a torque sensor (not shown). Controller 12 may also receive addition transmission information from sensors 277, which may include but are not limited to pump output line pressure sensors, transmission hydraulic pressure sensors (e.g., gear clutch fluid pressure sensors), transmission oil temperature sensors, ISG temperature sensors, driver in driver seat detection switch, driver's door switch, heart beat sensors, BISG temperature sensors, and ambient temperature sensors.

In some examples, controller 12 may communicate with and exchange data with navigation system 235 (e.g., a second controller). Navigation system 235 may determine a position and speed of vehicle 290 via data received from global positioning satellites (not shown). Navigation system 235 may also receive input via voice commands or via human/machine interface to determine a vehicle destination. Navigation system 235 may select a travel route based on the vehicle's present position and the vehicle's destination. Navigation system 235 may determine the travel route based on maps that may be stored within navigation system 235. Maps stored in navigation system 235 may include locations of traffic signs, fueling stations, and other points of interest.

Thus, the system of FIGS. 1 and 2 provides for a system for operating a vehicle, comprising: an internal combustion engine; a catalyst included in an exhaust system of the internal combustion engine; a gear selector; and a controller including executable instructions stored in non-transitory memory that cause the controller to inhibit forward or reverse motion of the vehicle in response to a temperature of the catalyst being less than a threshold temperature. In a first example, the system further comprises additional instructions to permit the vehicle to permit motion of the vehicle in response to the catalyst exceeding the threshold temperature. In a second example that may include the first example, the system further comprises additional instructions to deactivate a transmission pump in response to the temperature of the catalyst, and where forward or reverse motion are inhibited via prohibiting engagement of a gear. In a third example that may include one or more of the first and second examples, the system further comprises a torque converter clutch and additional instructions to fully close the torque converter clutch in response to the temperature of the catalyst being less than the threshold temperature. In a fourth example that may include one or more of the first through third examples, the system further comprises additional instructions to apply a friction brake of the vehicle in response to the temperature of the catalyst. In a fifth example that may include one or more of the first through fourth examples, the system further comprises additional instructions to limit driver demand torque in response to the friction brake being applied and the temperature of the catalyst being less than the threshold temperature. In a sixth example that may include one or more of the first through fifth examples, the system further comprises additional instructions to inhibit the gear selector from changing state. In a seventh example that may include one or more of the first through sixth examples, the system further comprises additional instructions to adjust a drive mode of the vehicle in response to the temperature of the catalyst.

Figure 4:
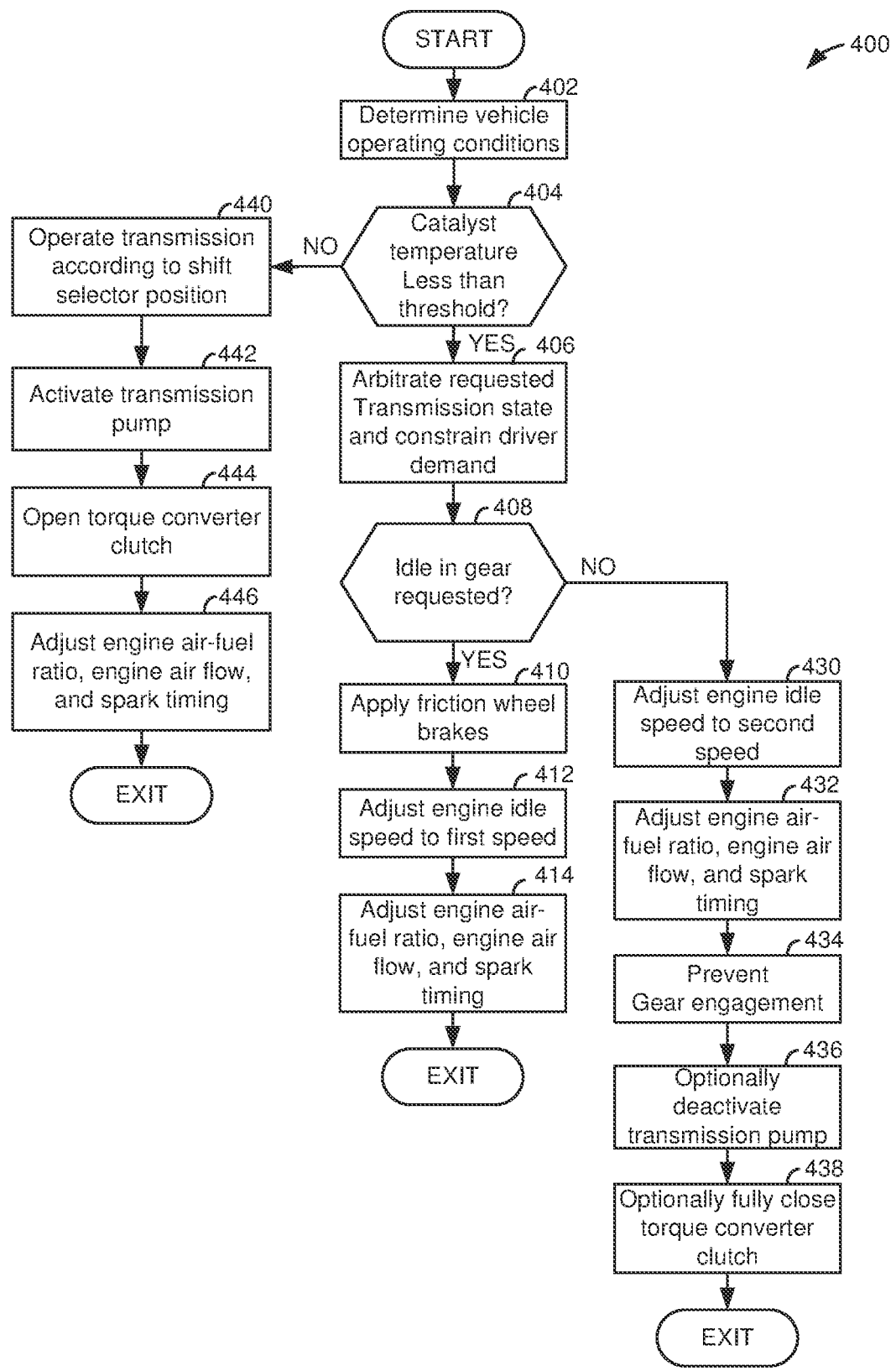
FIG. 4 shows a flowchart of an example method for operating a vehicle.

Referring now to FIG. 3, a vehicle operating sequence according to the method of FIG. 4 is shown. The sequence of FIG. 3 may be performed via the system of FIGS. 1 and 2. The vertical lines at t0-t7 represent times of interest during the sequence. The double SS marks along the horizontal axes represent breaks in time and the breaks may be long or short in duration.

The first plot from the top of FIG. 3 is a catalyst temperature versus time. The vertical axis represents the catalyst temperature and the catalyst temperature increases in the direction of the vertical axis arrow. The horizontal axis represents time and the amount of time increases from the left side of the plot to the right side of the plot. Horizontal line 350 represents a threshold catalyst temperature (e.g., a catalyst light-off temperature). Trace 302 represents the catalyst temperature.

The second plot from the top of FIG. 3 is a plot of a vehicle propulsion lock-out state versus time. The vertical axis represents the vehicle propulsion lock-out state and the vehicle is inhibited from moving in a forward or reverse direction when trace 304 is at a level that is near the level of the vertical axis arrow. The vehicle is not inhibited from moving in the forward or reverse direction based on a temperature of the catalyst when trace 304 is at a level that is near the horizontal axis. The horizontal axis represents time and the amount of time increases from the left side of the plot to the right side of the plot. Trace 304 represents the vehicle propulsion lock-out state.

The third plot from the top of FIG. 3 is a plot of an actual transmission gear selector position versus time. The vertical axis represents actual transmission gear selector position and the actual transmission gear selector is engaged in park when trace 306 is at the level of P along the vertical axis, engaged in reverse gear when trace 306 is at the level of R along the vertical axis, engaged in neutral when trace 306 is at the level of N along the vertical axis, engaged in a forward gear (e.g., first gear) when trace 306 is at the level of D along the vertical axis, engaged in first gear when trace 306 is at the level of L along the vertical axis. The horizontal axis represents time and the amount of time increases from the left side of the plot to the right side of the plot. Trace 306 represents the actual transmission gear selector position.

The fourth plot from the top of FIG. 3 is a plot of an engaged transmission gear selector position versus time. The vertical axis represents engaged transmission gear selector position and the engaged transmission gear selector is engaged in park when trace 308 is at the level of P along the vertical axis, engaged in reverse gear when trace 308 is at the level of R along the vertical axis, engaged in neutral when trace 308 is at the level of N along the vertical axis, engaged in a forward gear (e.g., first gear) when trace 308 is at the level of D along the vertical axis, engaged in first gear when trace 308 is at the level of L along the vertical axis. The horizontal axis represents time and the amount of time increases from the left side of the plot to the right side of the plot. Trace 308 represents the engaged transmission gear selector position.

The fifth plot from the top of FIG. 3 is a plot of a friction brake state versus time. The vertical axis represents the friction brake state and the friction brakes are applied when trace 310 is at a level that is near the level of the vertical axis arrow. The friction brakes are not applied when trace 310 is at a level that is near the horizontal axis. The horizontal axis represents time and the amount of time increases from the left side of the plot to the right side of the plot. Trace 310 represents the friction brake state.

The sixth plot from the top of FIG. 3 is a plot of a transmission pump state versus time. The vertical axis represents the transmission pump state and the transmission pump is activated when trace 312 is at a level that is near the level of the vertical axis arrow. The transmission pump is not activated when trace 312 is at a level that is near the horizontal axis. The horizontal axis represents time and the amount of time increases from the left side of the plot to the right side of the plot. Trace 312 represents the transmission pump state.

The seventh plot from the top of FIG. 3 is a plot of a torque converter clutch state versus time. The vertical axis represents the torque converter clutch state and the torque converter clutch is applied when trace 314 is at a level that is near the level of the vertical axis arrow. The torque converter clutch is not applied when trace 314 is at a level that is near the horizontal axis. The horizontal axis represents time and the amount of time increases from the left side of the plot to the right side of the plot. Trace 314 represents the torque converter clutch state.

The eighth plot from the top of FIG. 3 is a plot of an engine state versus time. The vertical axis represents the engine state and the engine is running (e.g., rotating and combusting fuel) when trace 316 is at a level that is near the level of the vertical axis arrow. The engine is not running when trace 316 is at a level that is near the horizontal axis. The horizontal axis represents time and the amount of time increases from the left side of the plot to the right side of the plot. Trace 316 represents the engine state.

At time t0, the engine is off and the torque converter clutch is open. The catalyst temperature is less than threshold 350 and the propulsion system is not locked out. The gear selector is in the park position and the engaged gear is park. The friction brakes are not applied.

At time t1, the vehicle enters propulsion lock out due to the engine starting and catalyst temperature being less than catalyst temperature threshold 350. The torque converter clutch is held open and the actual gear selector position is park. The transmission remains in park and the vehicle's friction brakes are released since the vehicle's position is maintained by the transmission being in park. In some examples, the transmission pump is not activated and the brake pump (not shown) is not activated to reduce parasitic losses. In some examples, additional pumps (not shown), if present, and required to operate clutches in a transfer case of an all-wheel drive vehicle and/or one or more differentials, may also be deactivated to reduce parasitic losses. In this mode of operation, frictional losses within internal clutches, planetary gear sets, and brakes may be at a higher level (as they are permitted to rotate freely), but frictional losses of the torque converter may be lower since the torque converter pump speed may be increased to reduce torque converter slip. This mode of operation may be preferred and it may be more desirable or less desirable to reduce engine emissions depending on engine temperature, transmission oil temperature, and the desired engine idle speed. The catalyst temperature begins to increase.

At time t2, the engine remains activated and the torque converter clutch remains open. The actual gear selector position is moved from park to drive by a human driver (not shown), but the transmission remains engaged in park. In this example, the gear selector position is not inhibited from changing position in this mode, but it may be restricted from moving in other examples. The vehicle's friction brakes continue to not be applied since the transmission remains in park. The movement of the actual gear selector position does not change the propulsion lock out state or the engaged gear in this example. The catalyst temperature continues to increase.

At time t3, the catalyst temperature exceeds threshold 350 so the propulsion lock out is released. The friction brakes are applied, the transmission pump is activated, and actual gear position is changed to drive in response to the catalyst temperature exceeding threshold 350. In some examples, the driver may be notified that drive is engaged and vehicle motion is permitted. In another examples, the actual engaged gear may remain in park, and the driver may be asked to first move the gear selection lever to park and depress the brakes before selecting drive, reverse or low is allowed. Torque converter remains unlocked. The engine continues to operate. A break in the sequence occurs between time t3 and time t4.

In other examples, if the brake pedal is in a released state at the time the catalyst temperature exceeds a threshold temperature, the driver may be asked (e.g., through the human/machine interface) to depress the brake pedal then release it to release the brakes and propel the vehicle.

At time t4, the engine is off and the torque converter clutch is open. The catalyst temperature is less than threshold 350 and the propulsion system is not locked out. The gear selector is in the park position and the engaged gear is park. The friction brakes are not applied.

At time t5, the vehicle enters the propulsion lock out state in response to the engine starting and catalyst temperature being less than threshold catalyst temperature 350. The transmission pump is activated so that the torque converter clutch may be closed. The actual gear selector position is park and the transmission is engaged in park. The vehicle's friction brakes are not applied since a parking pawl (not shown) is engaged when the vehicle is in park. Additionally, the transmission's gears are not engaged and some components within the transmission are permitted to rotate freely. Engaging the torque converter clutch reduces slip within the torque converter so that engine torque may be transmitted directly to the transmission input shaft. The vehicle is in a propulsion lock out state and vehicle motion is inhibited. In this mode of operation, frictional losses within internal clutches, planetary gear sets, and brakes may be at a higher level, but frictional losses of the torque converter may be lower since the torque converter turbine is directly coupled to the torque converter turbine. The catalyst temperature begins to increase.

This mode may be used in some examples (e.g., depending on transmission characteristics, engine temperature, transmission oil temperature, and the desired engine idle speed) during a part of or the whole catalyst warmup phase (e.g., before catalyst light-off temperature is reached) where the mode may reduce the cumulative vehicle emissions while the catalyst is below operating temperature.

The torque converter clutch may be closed and then opened before catalyst reaches light-off temp. This may be desirable if the transmission oil temp is too low because higher friction initially may heat the transmission oil faster to reduce its viscosity and reduce frictional losses later during the catalyst warm-up phase. These actions may increase emissions initially, but they may reduce the cumulative emissions before catalyst light-off. Additionally, in some examples, the transmission may be placed in drive while the vehicle's friction brakes are applied to reduce engine emissions.

At time t6, the vehicle remains in propulsion lock out and the transmission remains in park. The torque converter clutch is opened and the transmission pump is turned off.

At time t7, the catalyst temperature exceeds threshold 350 so the propulsion lock out is released and the torque converter clutch remains open. In addition, the transmission oil pump is activated so that if the gear selector changes position to drive, the vehicle may be ready to move. The gear selector remains in park and the engaged gear is park. The friction brakes are not applied because the vehicle is in park.

In this way, a vehicle may be inhibited from moving so that engine load may not increase above a threshold engine load. Holding engine load below the threshold load may hold engine emissions to a lower level until the catalyst reaches light-off temperature. Once the catalyst reaches light-off temperature where it may operate more efficiently, the engine load may be increased so that the vehicle may be propelled in an expected way. Consequently, vehicle drivability may be maintained while engine emissions may be reduced.

Referring now to FIG. 4, a method for operating a vehicle is shown. The method of FIG. 4 may be stored as executable instructions in controller 12 for the system of FIGS. 1 and 2. Further, the method of FIG. 4 may provide the example sequence shown in FIG. 3. In addition, the methods of FIG. 4 may work in cooperation with the system of FIGS. 1 and 2 to receive data and adjust actuators to control the system of FIGS. 1 and 2 in the physical or real world.

At 402, method 400 determines vehicle operating conditions. Vehicle operating conditions may be determined via the controller receiving input from the various sensors that are coupled to the controller. Vehicle operating conditions may include but are not limited to driver demand torque, vehicle speed, engine speed, engine load, transmission operating state, ambient temperature, ambient pressure, engine temperature, transmission oil temperature, vehicle speed, battery SOC, and brake pedal position. Method 400 proceeds to 404.

At 404, method 400 judges if catalyst temperature is less than a threshold temperature (e.g., a catalyst light-off temperature, or a temperature at which catalyst efficiency exceeds a threshold efficiency, such as 50% efficiency). If so, the answer is yes and method 400 proceeds to 406. Otherwise, the answer is no and method 400 proceeds to 440. If method 400 proceeds to 406, method 400 may display a message to inform the vehicle's occupants that the vehicle is temporarily in propulsion lock out mode. The propulsion lock out mode includes taking actions to reduce vehicle motion in forward and reverse directions. In addition, if method 400 enters propulsion lock out mode, it may also exit propulsion lock out mode and proceed directly to 440 during special vehicle operating conditions. For example, if vehicle occupants indicate that the vehicle is being used in a high urgency condition or if the controller infers a high urgency condition, method 400 may proceed directly to 440.

At 440, method 400 operates the transmission according to a position of a gear selector. For example, if a transmission gear selector is in the drive position, the transmission may be engaged in a forward gear (e.g., 1-6). In addition, if the vehicle is exiting a propulsion lock out mode where actions are taken to reduce vehicle motion in the forward and reverse directions, method 400 may hold the vehicle stopped until a brake pedal transitions from being applied to being released and until driver demand torque exceeds a threshold torque. Method 400 proceeds to 442.

At 442, method 400 activates the transmission oil pump. The transmission oil pump may be activated by supplying electric power to the transmission oil pump if the pump is electrically driven. Method 400 proceeds to 444.

At 444, method 400 may open a torque converter clutch that is closed. The torque converter clutch may be opened via withdrawing electric power or hydraulic pressure from a torque converter clutch actuator. Method 400 proceeds to 446.

At 446, method 400 adjusts spark timing to base spark timing, engine air-fuel ratio to a stoichiometric or base air-fuel ratio, and engine air flow to a base air flow so that engine fuel economy may be improved. Method 400 proceeds to exit.

At 406, method 400 arbitrates a requested transmission state. Engine emissions during a cold engine start may be affected by engine temperature, transmission oil temperature, ambient air temperature, and engine idle speed. For example, engine emissions may increase when engine temperatures are lower due to clearances within the engine and fuel preparation. Engine emissions may also be affected by transmission oil temperature and transmission oil viscosity. In particular, at lower transmission oil temperatures, the engine load to rotate the engine at a desired speed may increase since more engine torque may be needed to rotate components within the transmission. Higher engine idle speeds may increase the amount of heat that is delivered to the catalyst, but the engine may consume more fuel and generate higher emissions levels when the engine is operated at higher speeds. In this way, these and other vehicle operating conditions may affect engine emissions and the amount of energy that is delivered to heat a catalyst.

In one example, method 400 may select whether the engine idles with the transmission engaged in a gear (e.g., a forward or reverse gear) or with the transmission not engaged in gear (e.g., in park or neutral). In particular, method 400 may select that the engine idle while waiting for the catalyst temperature to exceed the threshold temperature with the transmission in gear or with the transmission out of gear according to a map that may be indexed via engine temperature, transmission oil temperature, ambient temperature, and requested engine idle speed. A table or function may map transmission state (e.g., engaged in gear or not engaged in gear) as a function of engine temperature, transmission oil temperature, ambient air temperature, and requested engine idle speed. The table or function outputs a request for the transmission to be engaged in a gear or not be engaged in a gear while catalyst temperature is less than a threshold temperature. In other examples, combinational logic or other functions may select the requested transmission operating state while the catalyst temperature is less than a threshold temperature.

In addition, method 400 limits or constrains driver demand torque to less than a threshold driver demand torque. In one example, method 400 may ignore or not respond to a change in driver demand pedal application amount that exceeds a threshold driver demand pedal application amount. In this way, driver demand may be constrained to limit engine load and engine emissions. In some examples, method 400 may ignore driver demand torque and continue to operate the engine in an idle speed control mode. Method 400 proceeds to 408.

At 408, method 400 judges whether or not the transmission is to be operated in a forward or reverse gear. If so, the answer is yes and method 400 proceeds to 410. Otherwise, the answer is no and method 400 proceeds to 430.

At 410, method 400 applies the friction brakes. The friction brakes are applied while the transmission is engaged in forward or reverse to reduce vehicle movement and to allow friction within the torque converter to increase while decreasing friction within transmission components (e.g., clutches, brakes, and planetary gear sets). Method 400 proceeds to 412.

At 412, method 400 adjusts engine idle speed to a first engine idle speed. The first engine idle speed may be based on the engine being engaged in a gear. The first engine idle speed (e.g., 800 RPM) may be lower than the second engine idle speed mentioned at 430. Method 400 proceeds to 414.

At 414, method 400 adjusts engine spark timing, engine air-fuel ratio, and engine air-flow to provide the limited requested driver demand torque. In one example, the spark timing may be retarded from top-dead-center compression stroke and the air-fuel ratio may be leaner than 15:1. Method 400 proceeds to exit.

At 430, method 400 adjusts engine idle speed to a second idle speed. The second idle speed may be increased over a base idle speed. For example, if the base engine idle speed is 800 RPM, the second engine idle speed may be raised to 1200 RPM. Method 400 proceeds to 432.

At 432, method 400 method 400 adjusts engine spark timing, engine air-fuel ratio, and engine air-flow. In one example, the spark timing may be retarded from top-dead-center compression stroke, the engine air flow may be increased from a base engine air flow, and the air-fuel ratio may be leaner than 15:1. Method 400 proceeds to 434.

At 434, method 400 may inhibit engagement of a forward or reverse gear of the transmission. In one example, method 400 may inhibit engagement of a forward gear via not supplying oil pressure to close transmission clutches. In another example, method 400 may inhibit engagement of forward or reverse gears via inhibiting movement of a gear selector into drive, reverse, and low positions. The transmission controller may then not engage the gears that are not selected. Method 400 proceeds to 436.

At 436, method 400 optionally deactivates the transmission fluid pump and a brake pump if present. By deactivating the transmission fluid pump, transmission gears may not be engaged. In addition, deactivating the transmission fluid pump may reduce a load that is applied to the engine so that engine load may be reduced. Reducing engine load may reduce engine emissions by reducing consumption of fuel. Further, additional pumps, if present and required to operate clutches in a transfer case of an all-wheel drive vehicle and/or one or more differentials, may also be deactivated to reduce parasitic losses. Method 400 proceeds to 438.

At 438, method 400 optionally closes the torque converter clutch so that engine torque may be directly transferred from the engine to the transmission input shaft, thereby bypassing the torque converter and lowering torque converter slip and friction. Since the transmission is not engaged in a forward or reverse gear, friction within the transmission clutches, planetary gear set, and brakes may increase. Method 400 proceeds to exit.

In this way, method 400 may reduce a possibility of vehicle motion until catalyst temperature exceeds a threshold temperature so that engine load and engine emissions may be reduced. In addition, method 400 may select to engage a transmission in gear or inhibit engagement of a gear to reduce engine emissions during a cold engine start.

Thus, the method of FIG. 4 provides for a method for operating a vehicle, comprising: inhibiting the vehicle from moving in a forward or reverse direction via a controller in response to a catalyst temperature being less than a threshold temperature. In a first example, the method includes where inhibiting the vehicle from moving in the forward or reverse direction includes inhibiting a transmission gear from being engaged. In a second example that may include the first example, the method includes where inhibiting the vehicle from moving includes applying friction brakes to inhibit the vehicle from moving. In a third example that may include one or more of the first example and the second examples, the method includes where inhibiting the vehicle from moving also includes limiting engine output power, and further comprises: deactivating a brake pump. In a fourth example that may include one or more of the first through third examples, the method includes where the threshold temperature is a catalyst light-off temperature. In a fifth example that may include one or more of the first through fourth examples, the method further comprises providing notice to a vehicle's driver that the vehicle is being inhibited from moving. In a sixth example that may include one or more of the first through fifth examples, the method includes where inhibiting the vehicle from moving includes inhibiting a shifter from entering a forward or reverse gear.

The method of FIG. 4 also provides for a method for operating a vehicle, comprising: in response to a first condition, inhibiting the vehicle from moving in a forward direction or a reverse direction via a controller in response to a catalyst temperature being less than a threshold temperature via applying vehicle friction brakes; and in response to a second condition, inhibiting the vehicle from moving in the forward direction or the reverse direction via the controller in response to a catalyst temperature being less than the threshold temperature via inhibiting engagement of a forward or a reverse gear. In a first example, the method includes where the forward gear or reverse gear are inhibited from engaging via a shift lever. In a second example that may include the first example, the method includes where the forward gear or reverse gear are inhibited from engaging via inhibiting a clutch from closing. In a third example that may include the first through second examples, the method includes where the first condition is based on transmission oil temperature. In a fourth example that may include the first through third examples, the method includes where the second condition is based on an engine temperature.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
inhibiting the vehicle from moving in a forward or reverse direction via a controller in response to a catalyst temperature being less than a threshold temperature.

2. The method of claim 1, where inhibiting the vehicle from moving in the forward or reverse direction includes inhibiting a transmission gear from being engaged.

3. The method of claim 1, where inhibiting the vehicle from moving includes applying friction brakes to inhibit the vehicle from moving.

4. The method of claim 1, where inhibiting the vehicle from moving also includes limiting engine output power and preventing engagement of a gear, and further comprising:
deactivating a brake pump.

5. The method of claim 1, where the threshold temperature is a catalyst light-off temperature.

6. The method of claim 1, further comprising providing notice to a vehicle's driver that the vehicle is being inhibited from moving.

7. The method of claim 1, where inhibiting the vehicle from moving includes inhibiting a shifter from entering a forward or reverse gear.

8. A system for operating a vehicle, comprising:
an internal combustion engine;
a catalyst included in an exhaust system of the internal combustion engine;
a gear selector; and
a controller including executable instructions stored in non-transitory memory that cause the controller to inhibit forward or reverse motion of the vehicle in response to a temperature of the catalyst being less than a threshold temperature.

9. The system of claim 8, further comprising additional instructions to permit the vehicle to permit motion of the vehicle in response to the catalyst exceeding the threshold temperature.

10. The system of claim 8, further comprising additional instructions to deactivate a transmission pump in response to the temperature of the catalyst, and where forward or reverse motion are inhibited via prohibiting engagement of a gear.

11. The system of claim 8, further comprising a torque converter clutch and additional instructions to fully close the torque converter clutch in response to the temperature of the catalyst being less than the threshold temperature.

12. The system of claim 8, further comprising additional instructions to apply a friction brake of the vehicle in response to the temperature of the catalyst.

13. The system of claim 8, further comprising additional instructions to limit driver demand torque in response to the temperature of the catalyst being less than the threshold temperature.

14. The system of claim 8, further comprising additional instructions to inhibit the gear selector from changing state.

15. The system of claim 8, where inhibiting forward or reverse motion of the vehicle also includes limiting engine output power and preventing engagement of a gear, and further comprising:
additional instructions to deactivate a brake pump.

16. A method for operating a vehicle, comprising:
in response to a first condition, inhibiting the vehicle from moving in a forward direction or a reverse direction via a controller in response to a catalyst temperature being less than a threshold temperature via applying vehicle friction brakes; and in response to a second condition, inhibiting the vehicle from moving in the forward direction or the reverse direction via the controller in response to the catalyst temperature being less than the threshold temperature via inhibiting engagement of a forward gear or a reverse gear.

17. The method of claim 16, where the forward gear or the reverse gear are inhibited from engaging via a shift lever.

18. The method of claim 16, where the forward gear or the reverse gear are inhibited from engaging via inhibiting a clutch from closing.

19. The method of claim 16, where the first condition is based on transmission oil temperature.

20. The method of claim 16, where the second condition is based on an engine temperature.

\* \* \* \* \*